United States Patent
Hara et al.

(10) Patent No.: US 11,938,925 B2
(45) Date of Patent: Mar. 26, 2024

(54) VEHICLE MOVEMENT ASSIST SYSTEM

(71) Applicant: HONDA MOTOR CO., LTD., Tokyo (JP)

(72) Inventors: Yuki Hara, Saitama (JP); Syoichi Kobayashi, Saitama (JP); Yasushi Shoda, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 433 days.

(21) Appl. No.: 17/212,189

(22) Filed: Mar. 25, 2021

(65) Prior Publication Data

US 2021/0300349 A1 Sep. 30, 2021

(30) Foreign Application Priority Data

Mar. 31, 2020 (JP) ................................ 2020-062879

(51) Int. Cl.
*B60W 30/09* (2012.01)
*B60W 10/18* (2012.01)
(Continued)

(52) U.S. Cl.
CPC ............ *B60W 30/09* (2013.01); *B60W 10/20* (2013.01); *B60W 30/06* (2013.01);
(Continued)

(58) Field of Classification Search
CPC ...... B60W 30/06; B60W 10/18; B60W 30/09; B60W 10/20; B60W 30/0956;
(Continued)

(56) References Cited

U.S. PATENT DOCUMENTS 9,862,416 B2    1/2018  Imai et al.
11,493,922 B1*  11/2022 Avram ................ B60W 40/02
(Continued)

FOREIGN PATENT DOCUMENTS

CN    105683000 A    6/2016
CN    107226088 A    10/2017
(Continued)

OTHER PUBLICATIONS

Office Action for Chinese Patent Application No. 202110320724.4 dated Jul. 14, 2023, 11 pp.
(Continued)

*Primary Examiner* — Abby Y Lin
*Assistant Examiner* — Renee LaRose
(74) *Attorney, Agent, or Firm* — Armstrong Teasdale LLP (57) ABSTRACT

A vehicle movement assist system includes: an external environment sensor unmovably fixed to a vehicle; and a control device configured to acquire the position of an obstacle relative to the vehicle based on a result of detection performed by the external environment sensor and to execute an automatic moving process to autonomously move the vehicle. During execution of the automatic moving process, if the obstacle is detected in a recognition range set by the control device, the control device performs a notification to the driver and/or executes a process including deceleration or stopping of the vehicle. The control device is configured to change the recognition range in accordance with the travel state of the vehicle.

6 Claims, 5 Drawing Sheets

(51) Int. Cl.
  *B60W 10/20* (2006.01)
  *B60W 30/06* (2006.01)
  *B60W 30/095* (2012.01)
  *B60W 50/14* (2020.01)
  *B60W 60/00* (2020.01)

(52) U.S. Cl.
  CPC ........ *B60W 30/0956* (2013.01); *B60W 50/14* (2013.01); *B60W 60/0015* (2020.02); *B60W 10/18* (2013.01); *B60W 2420/403* (2013.01)

(58) Field of Classification Search
  CPC ............. B60W 50/14; B60W 60/0015; B60W 2420/42; B60W 30/08
  See application file for complete search history.

(56) References Cited

U.S. PATENT DOCUMENTS

| | | |
|---|---|---|
| 2006/0176160 A1 | 8/2006 | Zoratti et al. |
| 2013/0297173 A1 | 11/2013 | Takagi et al. |
| 2018/0160030 A1* | 6/2018 | Chaney, Jr. ............... B60R 1/12 |
| 2019/0277962 A1* | 9/2019 | Ingram ................... G01S 17/86 |
| 2020/0001863 A1* | 1/2020 | Li ......................... B60W 30/06 |

FOREIGN PATENT DOCUMENTS

| | | |
|---|---|---|
| JP | 2004351992 A | 12/2004 |
| JP | 2012144162 A | 8/2012 |
| JP | 2013053962 A | 3/2013 |
| JP | 2014004931 A | 1/2014 |
| JP | 2014076697 A | 5/2014 |
| JP | 2017214011 A | 12/2017 |
| WO | 2014203334 A1 | 12/2014 |

OTHER PUBLICATIONS

Notice of Reasons for Refusal for Japanese Patent Application No. 2020-062879 dated Oct. 3, 2023; 8 pp.

* cited by examiner

Fig.5A forward movement
(constant speed)

Fig.5B forward movement
(with acceleration)

Fig.5C rearward movement
(constant speed)

Fig.5D rearward movement
(with acceleration)

Fig.5E forward movement
with wheels steered to left

Fig.5F rearward movement
with wheels steered to left

VEHICLE MOVEMENT ASSIST SYSTEM

TECHNICAL FIELD

The present disclosure relates to a vehicle movement assist system for autonomously moving a vehicle. The vehicle movement assist system may be, for example, a parking assist system for autonomously moving a vehicle from a current position to a parking position or from the parking position to a position near the parking position.

BACKGROUND ART

Some vehicles are equipped with sensors for detecting obstacles around the vehicle. For example, the vehicle control device described in JP2004-351992A is provided with sensors whose orientation can be changed by respective electric motors depending on the steering angle, When the vehicle moves backward while turning, the sensors mounted on the front end of the vehicle are tilted in the direction opposite to the steering direction and the sensors mounted on the rear end of the vehicle are tilted in the steering direction, and if any sensor detects an obstacle, the vehicle is stopped.

However, the vehicle control device described in JP2004-351992A needs electric motors to change the orientations of the sensors, and these electric motors increase the number of components, which leads to an increase in the cost. Also, since the orientations of the sensors are changed to detect the obstacles in a region which the vehicle is going to pass, detection of an obstacle approaching the vehicle from a blind spot of the sensors created by the orientation change may be delayed, and this in turn may delay the process of stopping the vehicle. In addition, in the conventional parking assist system configured to stop the vehicle in response to detection of an obstacle in a prescribed range from the vehicle, if the range is too wide the vehicle is caused to stop frequently, with the result that it takes a long time for the vehicle to move to the target position, which is not desirable for the driver's convenience.

SUMMARY OF THE INVENTION

In view of such problems, an object of the present invention is to provide a vehicle movement assist system that can suppress an increase in the number of components, properly recognize an obstacle that may collide with the vehicle, and improve the driver's convenience.

One embodiment of the present invention provides a vehicle movement assist system (1), comprising: an external environment sensor (7) unmovably fixed to a vehicle to detect an obstacle around the vehicle; and a control device (15) configured to acquire a position of the obstacle relative to the vehicle based on a result of detection performed by the external environment sensor (7) and to execute an automatic moving process to autonomously move the vehicle, wherein the control device (15) is configured such that, during execution of the automatic moving process, if the obstacle is detected in a recognition range (51) set by the control device (15), the control device performs notification to a driver of the vehicle and/or executes a process including deceleration or stopping of the vehicle, the recognition range including a front recognition range (51a) set on a front side of the vehicle, a rear recognition range (51b) set on a rear side of the vehicle, and a pair of lateral recognition ranges (51c) set on either lateral side of the vehicle, the front recognition range (51a), and the rear recognition range (51b), and wherein the control device (15) is configured to change the recognition range (51) in accordance with a travel state of the vehicle. Note that the term "recognition range" does not indicate the entire (or maximum) range that can be recognized by the control device (more specifically, the external environment recognizing unit) based on the detection result of the external environment sensor, but is a range set within the entire range that can be recognized by the control device.

According to this configuration, because the external environment sensor is unmovably fixed to the vehicle, the vehicle movement assist system does not need to include a component, such as an electric motor, to make the sensor movable, and thus, the number of components of the vehicle movement assist system is reduced and an increase in the cost can be suppressed. In addition, because the recognition range is changed in accordance with the travel state of the vehicle, it is possible to properly recognize an obstacle without requiring a wide range to be fixedly set as the recognition range. This also prevents the control device from reacting to the obstacle unnecessarily, and thus, the driver's convenience is improved.

In the above configuration, preferably, the rear recognition range (51b) when the vehicle moves backward is larger than the front recognition range (51a) when the vehicle moves forward.

According to this configuration, when the vehicle moves backward and it is difficult for the driver to notice an obstacle around the vehicle, the part of the recognition range in the travel direction of the vehicle is made larger than when the vehicle moves forward, and therefore, the driver's anxiety is reduced and safety is not impaired compared to the system in which a fixed wide recognition range is used.

In the above configuration, preferably, the lateral recognition ranges (51c) when the vehicle moves backward are larger than the lateral recognition ranges (51c) when the vehicle moves forward.

According to this configuration, when the vehicle moves backward and it is difficult for the driver to notice an obstacle around the vehicle, the lateral recognition ranges are made larger than when the vehicle moves forward, and therefore, the driver's anxiety is reduced and safety is not impaired compared to the system in which a fixed wide recognition range is used.

In the above configuration, preferably, at least one of the lateral recognition ranges (51c) when the vehicle turns is larger than the lateral recognition range on a corresponding side when the vehicle moves straight.

According to this configuration, during turning in which the vehicle is displaced in the lateral direction, the lateral recognition range 51c is made larger, in other words, when the vehicle is moving straight (or not turning) and the risk of collision with an obstacle on the lateral side of the vehicle is small, the lateral recognition range 51c is made smaller, and therefore, the driver's convenience is improved while safety is not impaired compared to the system in which a fixed wide recognition range is used.

In one embodiment of the present invention, the vehicle is configured to change a travel direction in response to a change of a steering angle of a front wheel thereof, the lateral recognition range (51c) on an inner wheel side of turning when the vehicle moves forward to make a turn is larger than the lateral recognition range (51c) on a corresponding side when the vehicle moves straight forward, and the lateral recognition range (51c) on an outer wheel side of turning when the vehicle moves backward to make a turn is larger than the lateral recognition range (51c) on a corresponding side when the vehicle moves straight backward.

In the case where the front wheel is the steered wheel, when the vehicle moves forward to make a turn, the vehicle is displaced toward the inner wheel side, and when the vehicle moves backward to make a turn, the front portion of the vehicle is displaced toward the outer wheel side. According to the above configuration, the lateral recognition range on the side toward which the vehicle is displaced when the vehicle turns is enlarged, and therefore, the driver's convenience is improved while safety is not impaired compared to the system in which a fixed wide recognition range is used.

In another embodiment of the present invention, the vehicle is configured to change its travel direction in response to a change of a steering angle of a rear wheel thereof, the lateral recognition range (51c) on an outer wheel side of turning when the vehicle moves forward to make a turn is larger than the lateral recognition range (51c) on a corresponding side when the vehicle moves straight forward, and the lateral recognition range (51c) on an inner wheel side of turning when the vehicle moves backward to make a turn is larger than the lateral recognition range (51c) on a corresponding side when the vehicle moves straight backward.

In the case where the rear wheel is the steered wheel, when the vehicle moves forward to make a turn, the rear portion of the vehicle is displaced toward the outer wheel side, and when the vehicle moves backward to make a turn, the vehicle is displaced toward the inner wheel side. According to above configuration, the lateral recognition range on the side toward which the vehicle is displaced when the vehicle turns is enlarged, and therefore, the driver's convenience is improved while safety is not impaired compared to the system in which a fixed wide recognition range is used.

In the above configuration, preferably, the front recognition range (51a) when the vehicle moves forward with acceleration is larger than the front recognition range (51a) when the vehicle moves forward at a constant speed and the rear recognition range (51b) when the vehicle moves backward with acceleration is larger than the rear recognition range (51b) when the vehicle moves backward at a constant speed, and/or the lateral recognition ranges (51c) when the vehicle moves forward with acceleration are larger than the lateral recognition ranges (51c) when the vehicle moves forward at a constant speed and the lateral recognition ranges (51c) when the vehicle moves backward with acceleration are larger than the lateral recognition ranges (51c) when the vehicle moves backward at a constant speed.

According to this configuration, the recognition range during acceleration of the vehicle is widened, and therefore, safety is ensured and sudden braking during acceleration can be avoided, whereby good ride quality is achieved.

In the above configuration, preferably, the vehicle movement assist system includes a parking assist system (1) configured to perform, as the automatic moving process, an automatic parking process of autonomously moving the vehicle from a current position to a target position and stopping the vehicle at the target position.

According to this configuration, it is possible to provide a parking assist system in which the number of components is reduced and an increase in the cost is suppressed. The parking assist system is prevented from unnecessarily reacting to obstacles around the vehicle, whereby the driver's convenience is improved.

According to the present invention, it is possible to provide a vehicle movement assist system that can suppress an increase in the number of components, properly recognize an obstacle that may collide with the vehicle, and improve the driver's convenience.

MODE(S) FOR CARRYING OUT THE INVENTION

In the following, an embodiment of the present invention will be described in detail with reference to the drawings.

A parking assist system 1 is mounted on a vehicle such as an automobile provided with a vehicle control system 2 configured to make the vehicle travel autonomously.

Figure 1:
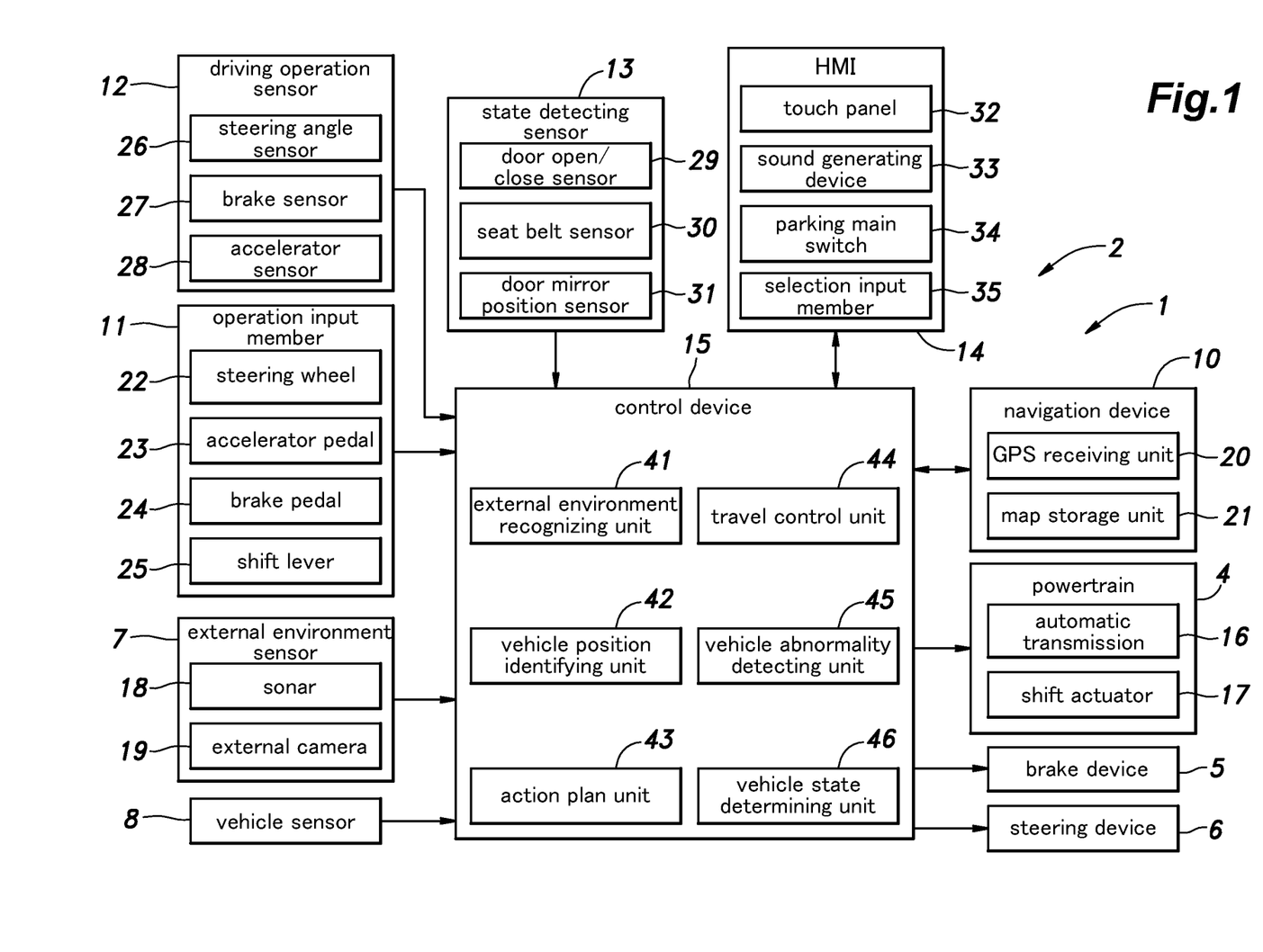
FIG. 1 is a functional block diagram of a vehicle provided with a parking assist system according to an embodiment of the present invention.

As shown in FIG. 1, the vehicle control system 2 includes a powertrain 4, a brake device 5, a steering device 6, an external environment sensor 7, a vehicle sensor 8, a navigation device 10, an operation input member 11, a driving operation sensor 12, a state detecting sensor 13, a human machine interface (HMI) 14, and a control device 15. The above components of the vehicle control system 2 are connected to each other so that signals can be transmitted therebetween via communication means such as a Controller Area Network (CAN).

The powertrain 4 is a device configured to apply a driving force to the vehicle. The powertrain 4 includes a power source and a transmission, for example. The power source includes at least one of an internal combustion engine, such as a gasoline engine and a diesel engine, and an electric motor. In the present embodiment, the powertrain 4 includes an automatic transmission 16 and a shift actuator 17 for changing a shift position of the automatic transmission 16 (a shift position of the vehicle). The brake device 5 is a device configured to apply a brake force to the vehicle. For example, the brake device 5 includes a brake caliper configured to press a brake pad against a brake rotor and an electric cylinder configured to supply an oil pressure to the brake caliper. The brake device 5 may include an electric parking brake device configured to restrict rotations of wheels via wire cables. The steering device 6 is a device for changing a steering angle of the wheels. For example, the steering device 6 includes a rack-and-pinion mechanism configured to steer (turn) the wheels and an electric motor configured to drive the rack-and-pinion mechanism. The powertrain 4, the brake device 5, and the steering device 6 are controlled by the control device 15.

The external environment sensor 7 serves as an external environment information acquisition device for detecting electromagnetic waves, sound waves, and the like from the surroundings of the vehicle to detect an object outside the vehicle and to acquire surrounding information of the vehicle. The external environment sensor 7 includes sonars 18 and external cameras 19. The external environment sensor 7 may further include a millimeter wave radar and/or a laser lidar. The external environment sensor 7 outputs a detection result to the control device 15.

Each sonar 18 consists of a so-called ultrasonic sensor. Each sonar 18 emits ultrasonic waves to the surroundings of the vehicle and captures the ultrasonic waves reflected by an object around the vehicle thereby to detect a position (distance and direction) of the object. Multiple sonars 18 are provided at each of a rear part and a front part of the vehicle. In the present embodiment, two pairs of sonars 18 are provided on a rear bumper so as to be spaced laterally from each other, two pairs of sonars 18 are provided on a front bumper so as to be spaced laterally from each other, one pair of sonars 18 is provided at a front end portion of the vehicle such that the two sonars 18 forming the pair are provided on left and right side faces of the front end portion of the vehicle, and one pair of sonars 18 is provided at a rear end portion of the vehicle such that the two sonars 18 forming the pair are provided on left and right side faces of the rear end portion of the vehicle. That is, the vehicle is provided with six pairs of sonars 18 in total. The sonars 18 provided on the rear bumper mainly detect positions of objects behind the vehicle. The sonars 18 provided on the front bumper mainly detect positions of objects in front of the vehicle. The sonars 18 provided at the left and right side faces of the front end portion of the vehicle detect positions of objects on left and right outsides of the front end portion of the vehicle, respectively. The sonars 18 provided at the left and right side faces of the rear end portion of the vehicle detect positions of objects on left and right outsides of the rear end portion of the vehicle, respectively.

The external cameras 19 are devices configured to capture images around the vehicle. Each external camera 19 consists of a digital camera using a solid imaging element such as a CCD or a CMOS, for example. The external cameras 19 include a front camera for capturing an image in front of the vehicle and a rear camera for capturing an image to the rear of the vehicle. The external cameras 19 may include a pair of left and right side cameras that are provided in the vicinity of the door mirrors of the vehicle to capture images on left and right sides of the vehicle.

The vehicle sensor 8 includes a vehicle speed sensor configured to detect the speed of the vehicle, an acceleration sensor configured to detect the acceleration of the vehicle, a yaw rate sensor configured to detect the angular velocity around a vertical axis of the vehicle, and a direction sensor configured to detect the direction of the vehicle. For example, the yaw rate sensor consists of a gyro sensor.

The navigation device 10 is a device configured to obtain a current position of the vehicle and provides route guidance to a destination and the like. The navigation device 10 includes a GPS receiving unit 20 and a map storage unit 21. The GPS receiving unit 20 identifies a position (latitude and longitude) of the vehicle based on a signal received from an artificial satellite (positioning satellite). The map storage unit 21 consists of a known storage device such as a flash memory or a hard disk, and stores map information.

The operation input member 11 is provided in a vehicle cabin to receive an input operation performed by the occupant (user) to control the vehicle. The operation input member 11 includes a steering wheel 22, an accelerator pedal 23, a brake pedal 24 (brake input member), and a shift lever 25 (shift member). The shift lever 25 is configured to receive an operation for switching the shift position of the vehicle.

The driving operation sensor 12 detects an operation amount of the operation input member 11. The driving operation sensor 12 includes a steering angle sensor 26 configured to detect a steering angle of the steering wheel 22, a brake sensor 27 configured to detect a pressing amount of the brake pedal 24, and an accelerator sensor 28 configured to detect a pressing amount of the accelerator pedal 23. The driving operation sensor 12 outputs a detected operation amount to the control device 15.

The state detecting sensor 13 is a sensor configured to detect a change in a state of the vehicle according to an operation by the occupant. The operation by the occupant detected by the state detecting sensor 13 includes an operation indicating an alighting intention (intention to alight from the vehicle) of the occupant and an operation indicating absence of an intention of the occupant to check the surroundings of the vehicle during an autonomous parking operation or an autonomous unparking operation. The state detecting sensor 13 includes, as sensors for detecting the operation indicating the alighting intention, a door open/close sensor 29 configured to detect opening and/or closing of a door of the vehicle and a seat belt sensor 30 configured to detect a fastening state of a seat belt. The state detecting sensor 13 includes, as a sensor to detect the operation corresponding to the abdicating intention, a door mirror position sensor 31 configured to detect a position of a door mirror. The state detecting sensor 13 outputs a signal indicating a detected change in the state of the vehicle to the control device 15.

The HMI 14 is an input/output device for receiving an input operation by the occupant and notifying the occupant of various kinds of information by display and/or voice. The HMI 14 includes, for example, a touch panel 32 that includes a display screen such as a liquid crystal display or an organic EL display and is configured to receive the input operation by the occupant, a sound generating device 33 such as a buzzer or a speaker, a parking main switch 34, and a selection input member 35. The parking main switch 34 receives the input operation by the occupant to execute selected one of an automatic parking process (autonomous parking operation) and an automatic unparking process (autonomous unparking operation). The parking main switch 34 is a so-called momentary switch that is turned on only while a pressing operation (pushing operation) is performed by the occupant. The selection input member 35 receives a selection operation by the occupant related to selection of the automatic parking process and the automatic unparking process. The selection input member 35 may consist of a rotary select switch, which preferably requires pressing as the selection operation.

The control device 15 consists of an electronic control unit (ECU) that includes a CPU, a nonvolatile memory such as a ROM, a volatile memory such as a RAM, and the like. The CPU executes operation processing according to a program so that the control device 15 executes various types of vehicle control. The control device 15 may consist of one piece of hardware, or may consist of a unit including multiple pieces of hardware. Further, the functions of the control device 15 may be at least partially executed by hardware such as an LSI, an ASIC, and an FPGA, or may be executed by a combination of software and hardware.

Further, the control device 15 executes an arithmetic process according to a program and thereby performs a conversion process of an image (video) captured by the external cameras 19 so as to generate a look-down image corresponding to a plan view of the vehicle and its surrounding area and a bird's-eye image corresponding to a three-dimensional image of the vehicle and a part of its surrounding area positioned in the travel direction as viewed from above. The control device 15 may generate the look-down image by combining the images of the front camera, the rear camera, and the left and right side cameras, and may generate the bird's-eye image by combining the image captured by the front camera or the rear camera facing the travel direction and the images captured by the left and right side cameras.

The parking assist system 1 is a system for executing the so-called automatic parking process and the so-called automatic unparking process, in which a vehicle is moved autonomously to a prescribed target position (a target parking position or a target unparking position) selected by the occupant so as to park or unpark the vehicle.

The parking assist system 1 includes the control device 15, the brake pedal 24 as a brake input member, the driving operation sensor 12, and the state detecting sensor 13.

The control device 15 controls the powertrain 4, the brake device 5, and the steering device 6 so as to execute an autonomous parking operation to move the vehicle autonomously to a target parking position and park the vehicle at the target parking position and an autonomous unparking operation to move the vehicle autonomously to a target unparking position and unpark the vehicle at the target unparking position. In order to execute such operations, the control device 15 includes an external environment recognizing unit 41, a vehicle position identifying unit 42, an action plan unit 43, a travel control unit 44, a vehicle abnormality detecting unit 45, and a vehicle state determining unit 46.

The external environment recognizing unit 41 recognizes an obstacle (for example, a parked vehicle or a wall) that is present around the vehicle based on the detection result of the external environment sensor 7, and thereby obtains information about the obstacle. Further, the external environment recognizing unit 41 analyzes the images captured by the external cameras 19 based on a known image analysis method such as pattern matching, and thereby determines whether a wheel stopper or an obstacle is present, and obtains the size of the wheel stopper or the obstacle in a case where the wheel stopper or the obstacle is present. Further, the external environment recognizing unit 41 may compute a distance to the obstacle based on signals from the sonars 18 to obtain the position of the obstacle.

Also, by the analysis of the detection result of the external environment sensor 7 (more specifically, by the analysis of the images captured by the external cameras 19 based on a known image analysis method such as pattern matching), the external environment recognizing unit 41 can acquire, for example, a lane on a road delimited by road signs and a parking space delimited by white lines and the like provided on a surface of a road, a parking lot, and the like.

The vehicle position identifying unit 42 identifies the position of the vehicle (the own vehicle) based on a signal from the GPS receiving unit 20 of the navigation device 10. Further, the vehicle position identifying unit 42 may obtain the vehicle speed and the yaw rate from the vehicle sensor 8, in addition to the signal from the GPS receiving unit 20, and identify the position and posture of the vehicle by the so-called inertial navigation.

The travel control unit 44 controls the powertrain 4, the brake device 5, and the steering device 6 based on a travel control instruction from the action plan unit 43 to make the vehicle travel.

The vehicle abnormality detecting unit 45 detects an abnormality of the vehicle (hereinafter referred to as "vehicle abnormality") based on signals from various devices and sensors. The vehicle abnormality detected by the vehicle abnormality detecting unit 45 includes failure of various devices necessary for driving the vehicle (for example, the powertrain 4, the brake device 5, and the steering device 6) and failure of various sensors necessary for making the vehicle travel autonomously (for example, the external environment sensor 7, the vehicle sensor 8, and the GPS receiving unit 20). Further, the vehicle abnormality includes failure of the HMI 14.

In the present embodiment, the vehicle abnormality detecting unit 45 can detect an abnormality in the screen display of the touch panel 32 based on at least a signal from the touch panel 32.

The vehicle state determining unit 46 acquires the state of the vehicle based on signals from various sensors provided in the vehicle, and determines whether the vehicle is in a prohibition state in which the autonomous movement (namely, the autonomous parking operation or the autonomous unparking operation) of the vehicle should be prohibited. The vehicle state determining unit 46 determines that the vehicle is in the prohibition state when the occupant performs a driving operation (override operation) of the operation input member 11. The override operation is an operation to override (cancel) the autonomous movement (namely, the autonomous parking operation or the autonomous unparking operation) of the vehicle.

More specifically, the vehicle state determining unit 46 may determine the initiation of the override operation when the pressing amount of the brake pedal 24 acquired (detected) by the brake sensor 27 has reached or exceeded a prescribed threshold (hereinafter referred to as "pressing threshold"). Additionally or alternatively, the vehicle state determining unit 46 may determine the initiation of the override operation when a pressing amount of the accelerator pedal 23 acquired (detected) by the accelerator sensor 28 has reached or exceeded a prescribed threshold. The vehicle state determining unit 46 may also determine the initiation of the override operation when a changing rate of the steering angle obtained (detected) by the steering angle sensor 26 has reached or exceeded a prescribed threshold.

Further, the vehicle state determining unit 46 determines, based on the detection result of the state detecting sensor 13, that the vehicle is in the prohibition state when the vehicle is in a state that reflects the alighting intention (intention to alight from the vehicle) of the occupant. More specifically, when the door open/close sensor 29 detects that the door is opened, the vehicle state determining unit 46 determines that the vehicle is in the prohibition state. Also, when the seat belt sensor 30 detects that the seat belt is released, the vehicle state determining unit 46 determines that the vehicle is in the prohibition state.

Further, the vehicle state determining unit 46 determines that, based on the detection result of the state detecting sensor 13, that the vehicle is in the prohibition state when the vehicle is in a state that reflects the absence of intention of the occupant to check the surroundings of the vehicle. More specifically, the vehicle state determining unit 46 determines that the vehicle is in the prohibition state when the door mirror position sensor 31 detects that the door mirror is retracted.

Also, when it is determined, based on the detection result of the state detecting sensor 13, that the door is opened and the seat belt is released, the vehicle state determining unit 46 determines that the alighting intention of the occupant is certain and that the vehicle is in a cancellation state in which the autonomous movement (namely, the autonomous parking operation or the autonomous unparking operation) of the vehicle should be canceled. In addition, the vehicle state determining unit 46 may determine that the vehicle is in the cancellation state when there is an input to a cancellation button displayed on the touch panel 32 while the vehicle is moving autonomously.

In the present embodiment, each vehicle seat provided in the vehicle cabin is provided with a seating sensor configured to detect seating of the occupant. The vehicle state determining unit 46 determines a seating position of the occupant (namely, the vehicle state determining unit 46 identifies the vehicle seat on which the occupant is seated) based on a signal from the seating sensor, and determines that the vehicle is in the cancellation state when the seat belt at the seating position is released and the door near the seating position is opened.

As described above, the driving operation sensor 12 and the state detecting sensor 13 each correspond to the vehicle state detecting device configured to detect the state of the vehicle (for example, the prohibition state in which the autonomous parking operation or the autonomous unparking operation of the vehicle should be prohibited). The vehicle state determining unit 46 determines the state of the vehicle based on the detection results of the driving operation sensor 12 and the state detecting sensor 13. By using the driving operation sensor 12, it is possible to easily detect the override operation of the occupant. By using the state detecting sensor 13, it is possible to easily detect an alighting operation of the user and a change in the state of the vehicle according to an extending/retracting operation of the door mirror.

The action plan unit 43 executes the automatic parking process (autonomous parking operation) or the automatic unparking process (autonomous unparking operation) when the vehicle is in a prescribed state and the HMI 14 or the parking main switch 34 receives a prescribed input by the user, which corresponds to a request for the automatic parking process or the automatic unparking process. More specifically, the action plan unit 43 executes the automatic parking process in a case where a prescribed input corresponding to the automatic parking process is performed when the vehicle is stopped or the vehicle is traveling at a low speed equal to or less than a prescribed vehicle speed (a vehicle speed at which a parking position candidate can be searched for). The action plan unit 43 executes the automatic unparking process (parallel unparking process) in a case where a prescribed input corresponding to the automatic unparking process is performed when the vehicle is stopped. The selection of the process to be executed (the automatic parking process or the automatic unparking process) may be made by the action plan unit 43 based on the state of the vehicle. Alternatively, the above selection may be made by the occupant via the touch panel 32 or the selection input member 35. When executing the automatic parking process, the action plan unit 43 first makes the touch panel 32 display a parking search screen for setting the target parking position. After the target parking position is set, the action plan unit 43 makes the touch panel 32 display a parking screen. When executing the automatic unparking process, the action plan unit 43 first makes the touch panel 32 display an unparking search screen for setting the target unparking position. After the target unparking position is set, the action plan unit 43 makes the touch panel 32 display an unparking screen.

Figure 2:
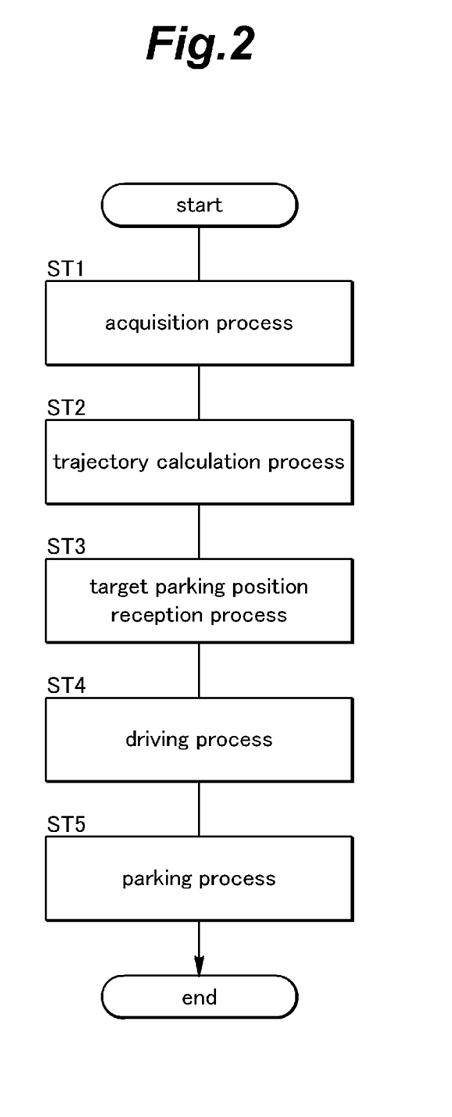
FIG. 2 is a flow chart of an automatic parking process in the parking assist system according to the embodiment.

In the following, the automatic parking process will be described with reference to FIG. 2. The action plan unit 43 first executes an acquisition process (step ST1) to acquire one or more parking spaces, if any. More specifically, in a case where the vehicle is stopped, the action plan unit 43 first makes the touch panel 32 of the HMI 14 display a notification that instructs the occupant to move the vehicle straight. While the occupant sitting in the driver's seat (hereinafter referred to as "driver") is moving the vehicle straight, the external environment recognizing unit 41 acquires, based on a signal from the external environment sensor 7, a position and size of each detected obstacle and positions of the white lines provided on the road surface. The external environment recognizing unit 41 extracts, based on the acquired position and size of the obstacle and the acquired positions of the white lines, one or more undelimited parking spaces and one or more delimited parking spaces, if any (hereinafter, the undelimited parking spaces and the delimited parking spaces will be collectively referred to as "parking spaces"). Each undelimited parking space is a space that is not delimited by the white lines or the like, has a size sufficient to park the vehicle, and is available (namely, there is no obstacle therein). Each delimited parking space is a space that is delimited by the white lines or the like, has a size sufficient to park the vehicle, and is available (namely, another vehicle (vehicle other than the own vehicle) is not parked).

Next, the action plan unit 43 executes a trajectory calculation process (step ST2) to calculate a trajectory of the vehicle from a current position of the vehicle to each extracted parking space. In a case where the trajectory of the vehicle can be calculated for a certain parking space, the action plan unit 43 sets the parking space as a parking position candidate where the vehicle can be parked, and make the touch panel 32 display the parking position candidate on the screen (the parking search screen). In a case where the trajectory of the vehicle cannot be calculated due to the presence of the obstacle, the action plan unit 43 does not set the parking space as a parking position candidate and does not make the touch panel 32 display the parking space on the screen. When the action plan unit 43 sets multiple parking position candidates (namely, multiple parking places for which the trajectory of the vehicle can be calculated), the action plan unit 43 makes the touch panel 32 display these parking position candidates.

Figure 3A:
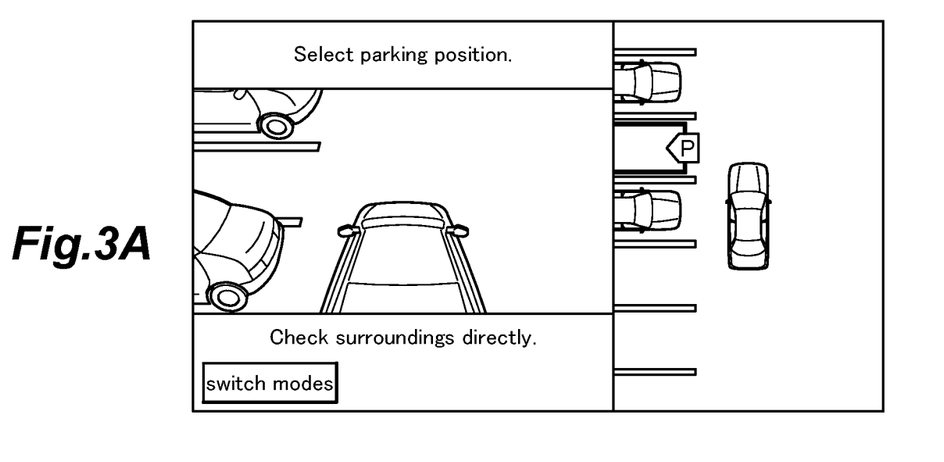
FIG. 3A is a diagram showing a screen display of a touch panel during a target parking position reception process in the parking assist system according to the embodiment.

Next, the action plan unit 43 executes a target parking position reception process (step ST3) to receive a selection operation performed by the occupant to select the target parking position, which is a parking position where the occupant wants to park the vehicle, and is selected from the one or more parking position candidates displayed on the touch panel 32. More specifically, the action plan unit 43 makes the touch panel 32 display the look-down image and the bird's-eye image in the travel direction on the parking search screen shown in FIG. 3A. When the action plan unit 43 acquires at least one parking position candidate, the action plan unit 43 makes the touch panel 32 display a frame that indicates the parking position candidate and an icon that corresponds to the frame in at least one of the look-down image and the bird's-eye image (in the look-down image in FIG. 3A) in an overlapping manner. The icon consists of a symbol indicating the parking position candidate (see "P" in FIG. 3A). Also, the action plan unit 43 makes the touch panel 32 display the parking search screen including a notification that instructs the driver to stop the vehicle and select the target parking position, so that the touch panel 32 receives the selection operation of the target parking position. The selection operation of the target parking position may be performed via the touch panel 32, or may be performed via the selection input member 35.

Figure 3B:
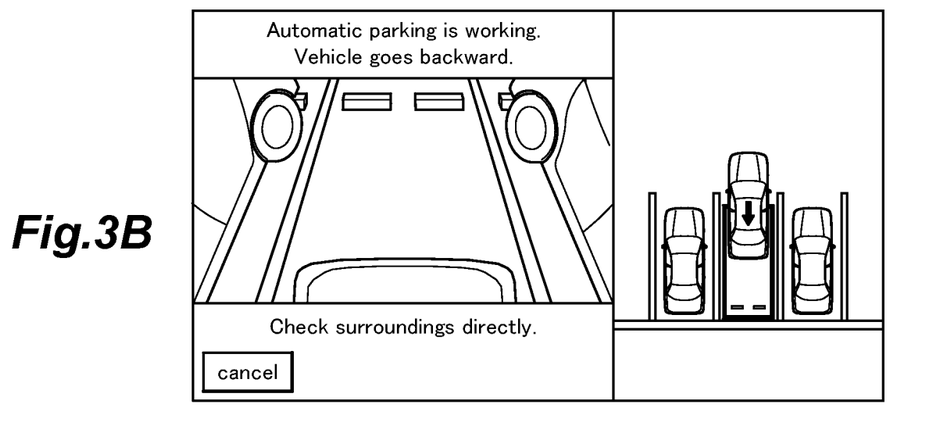
FIG. 3B is a diagram showing the screen display of the touch panel during a driving process in the parking assist system according to the embodiment.

After the vehicle is stopped and the target parking position is selected by the driver, the action plan unit 43 makes the touch panel 32 switch the screen from the parking search screen to the parking screen. As shown in FIG. 3B, the parking screen is a screen in which an image in the travel direction of the vehicle (hereinafter referred to as "travel direction image") is displayed on the left half of the touch panel 32 and the look-down image including the vehicle and its surrounding area is displayed on the right half thereof. At this time, the action plan unit 43 may make the touch panel 32 display a thick frame that indicates the target parking position selected from the parking position candidates and an icon that corresponds to the thick frame such that the thick frame and the icon overlap with the look-down image. This icon consists of a symbol indicating the target parking position, and is shown in a color different from the symbol indicating the parking position candidate.

After the target parking position is selected and the screen of the touch panel 32 is switched to the parking screen, the action plan unit 43 executes a driving process (step ST4) to make the vehicle travel along the calculated trajectory. At this time, the action plan unit 43 controls the vehicle based on the position of the vehicle acquired by the GPS receiving unit 20 and the signals from the external cameras 19, the vehicle sensor 8, and the like so that the vehicle travels along the calculated trajectory. At this time, the action plan unit 43 controls the powertrain 4, the brake device 5, and the steering device 6 so as to execute a switching operation for switching the travel direction of the vehicle (a reversing operation for reversing the travel direction of the vehicle). The switching operation may be executed repeatedly, or may be executed only once.

During the driving process, the action plan unit 43 may acquire the travel direction image from the external cameras 19 and make the touch panel 32 display the acquired travel direction image on the left half thereof. For example, as shown in FIG. 3B, when the vehicle is moving backward, the action plan unit 43 may make the touch panel 32 display an image to the rear of the vehicle captured by the external cameras 19 on the left half thereof. While the action plan unit 43 is executing the driving process, the surrounding image of the vehicle (the own vehicle) in the look-down image displayed on the right half of the touch panel 32 changes along with the movement of the vehicle. When the vehicle reaches the target parking position, the action plan unit 43 stops the vehicle and ends the driving process.

Figure 3C:
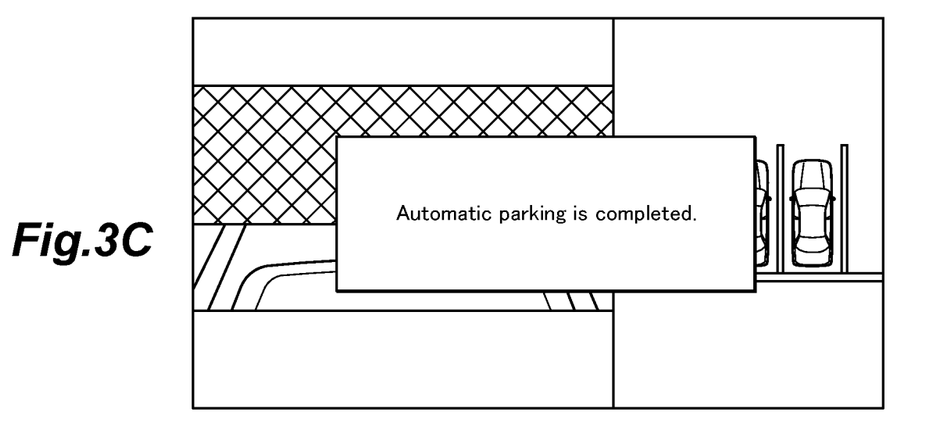
FIG. 3C is a diagram showing the screen display of the touch panel when automatic parking is completed in the parking assist system according to the embodiment.

When the driving process ends, the action plan unit 43 executes a parking process (step ST5). In the parking process, the action plan unit 43 first drives the shift actuator 17 to set the shift position (shift range) to a parking position (parking range). Thereafter, the action plan unit 43 drives the parking brake device, and makes the touch panel 32 display a pop-up window (see FIG. 3C) indicating that the automatic parking of the vehicle has been completed. The pop-up window may be displayed on the screen of the touch panel 32 for a prescribed period. Thereafter, the action plan unit 43 may make the touch panel 32 switch the screen to an operation screen of the navigation device 10 or a map screen.

In the parking process, there may be a case where the shift position cannot be changed to the parking position because of an abnormality of the shift actuator 17 or a case where the parking brake device cannot be driven because of an abnormality of the parking brake device. In these cases, the action plan unit 43 may make the touch panel 32 display the cause of the abnormality on the screen thereof.

Figure 4A:
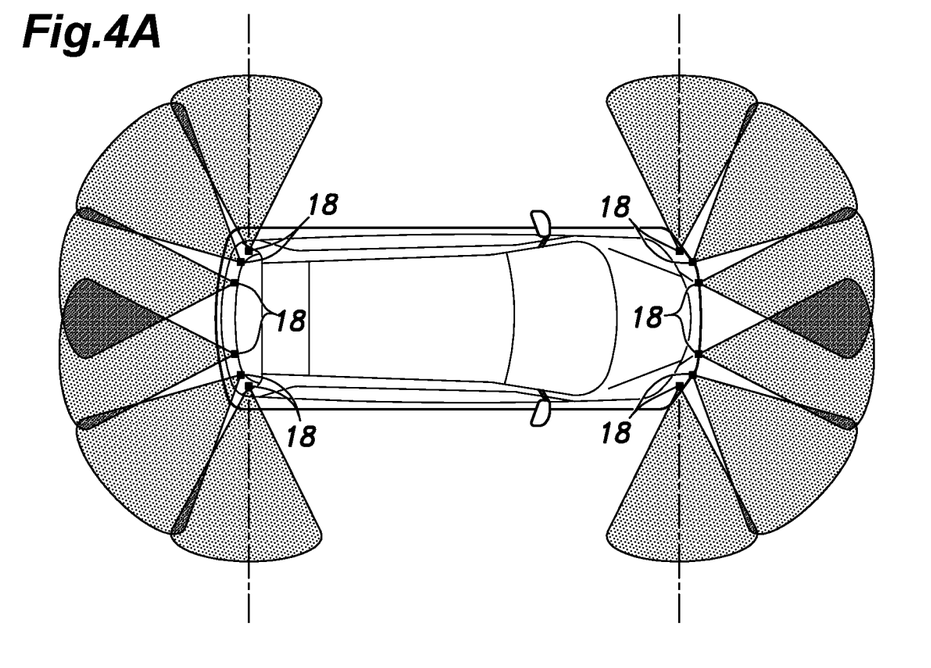
FIG. 4A is an explanatory diagram showing the imaging range of the external environment sensor (sonars) of the parking assist system according to the embodiment.
Figure 4B:
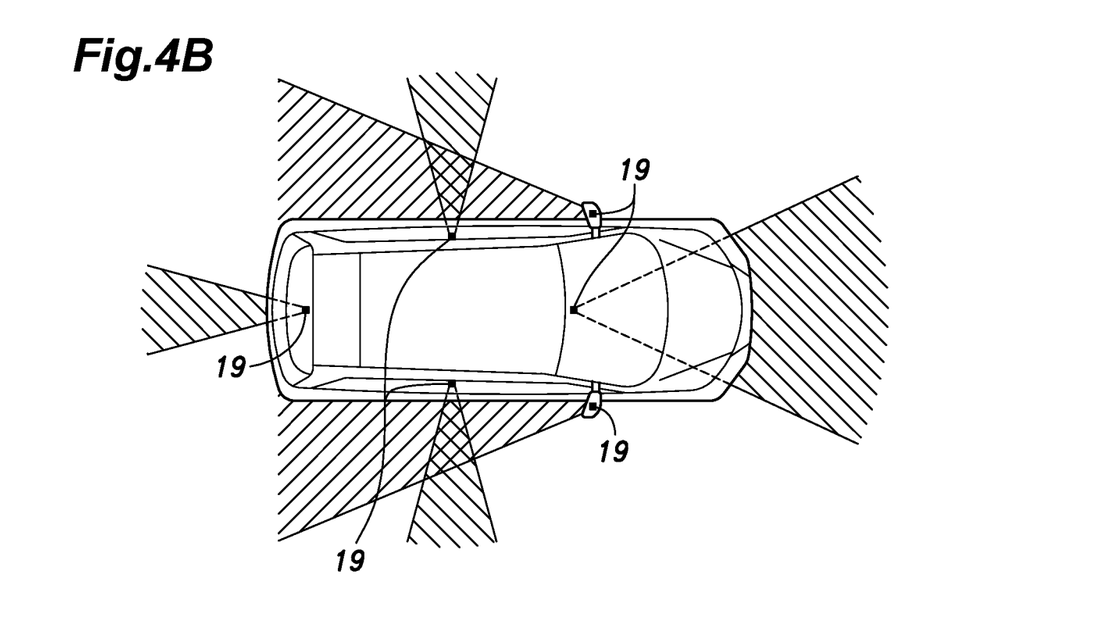
FIG. 4B is an explanatory diagram showing the imaging range of the external environment sensor (external cameras) of the parking assist system according to the embodiment.

As shown in FIG. 4A, the sonars 18 include: two left and right pairs of sonars provided on the rear bumper so as to be spaced laterally from each other, the sonars of each pair facing rearward and obliquely rearward, respectively; two left and right pairs of sonars provided on the front bumper so as to be laterally spaced from each other, the sonars of each pair facing forward and obliquely forward, respectively; a pair of sonars provided on the front end portion of the vehicle to face laterally outward; and a pair of sonars provided on the rear end portion of the vehicle to face laterally outward. As shown in FIG. 4B, the external cameras 19 include a front camera provided inside the windshield, a rear camera provided inside the rear window, a pair of left and right door mirror cameras installed on the door mirrors (side mirrors) so as to capture rear-view images on left and right sides of the vehicle, a pair of left and right pillar cameras provided on the center pillars (B pillars) so as to capture images on left and right sides of the vehicle. In FIGS. 4A and 4B, the detection area (imaging range) of each sonar 18 and the detection area (imaging range) of each external camera 19 are indicated by a dot pattern and hatching, respectively. The sonars 18 and the external cameras 19 are unmovably fixed to the vehicle, namely, the orientations of the sonars 18 and the external cameras 19 are not variable. Blind spots (or dead zones) of the sonars 18 and the external cameras 19 are present on either side of the vehicle, but areas that become blind spots on either side of the vehicle at some point of time will be covered by the sonars 18 that are mounted on the front end portion or the rear end portion of the vehicle so as to face laterally outward as the vehicle moves forward or backward. Therefore, the blind spots on either side of the vehicle are included in the range that can be recognized by the external environment recognizing unit 41 of the control device 15 based on the detection result of the sonars 18 and the external cameras 19. Note that "laterally outward" herein means a direction away from the vehicle in the lateral direction (does not mean the outer wheel side when the vehicle is turning).

With reference to FIGS. 5A to 5F, description will now be made of a recognition range 51, which is set by the control device 15 within the entire range that can be recognized by the external environment recognizing unit 41 of the control device 15 based on the detection result of the external environment sensor 7 (sonars 18 and external cameras 19). In each of FIGS. 5A to 5F, the recognition range 51 is indicated as a region inside the closed solid line surrounding the vehicle. During the execution of the automatic parking process, if the external environment recognizing unit 41 of the control device 15 determines that there is an obstacle within the recognition range 51 based on the result of detection performed by the external environment sensor 7, the travel control unit 44 of the control device 15 decelerates or stops the vehicle. Instead of the deceleration or stopping of the vehicle or in addition to the deceleration or stopping of the vehicle, the control device 15 may issue a warning or notify a message to the driver by using the HMI 14 or the like. For example, this notification may be display of the message on the touch panel 32, output of the message or warning sound from the sound generating device 33, or vibration of the seat belt or the seat. The control device 15 changes the recognition range 51 in accordance with the travel state of the vehicle. The recognition range 51 includes a front recognition range 51a set on a front side of the vehicle, a rear recognition range 51b set on a rear side of the vehicle, and two lateral recognition ranges 51c set on either lateral side of the vehicle, the front recognition range 51a, and the rear recognition range 51b. The front end of each lateral recognition range 51c coincides with the front end of the front recognition range 51a, and the rear end of each lateral recognition range 51c coincides with the rear end of the rear recognition range 51b. The travel state of the vehicle may include an acceleration of the vehicle, a steering angle of the wheels (turning state of the vehicle), whether the vehicle is moving forward or backward, and the combination thereof.

Figure 5A:
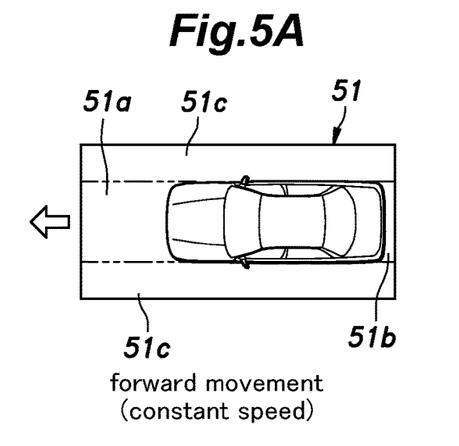
FIGS. 5A to 5F are explanatory diagrams showing the recognition range of the parking assist system according to the embodiment in various situations.

FIG. 5A shows the recognition range 51 when the vehicle moves forward at a constant speed with the steering angle of the wheels being zero (the vehicle is not turning). The recognition range 51 in this case is in the shape of a rectangle having a length along the fore and aft direction of the vehicle and a width along the lateral direction of the vehicle as seen in plan view, where the rear end of the recognition range 51 is positioned slightly rearward of the rear end of the vehicle, the front end of the recognition range 51 is positioned forward of the front end of the vehicle, and the left and right edges of the recognition range 51 are positioned laterally outward of the left and right edges of the vehicle. The rear end of the recognition range 51 may coincide with the rear end of the vehicle so that the area of the rear recognition range 51b is zero.

Figure 5B:
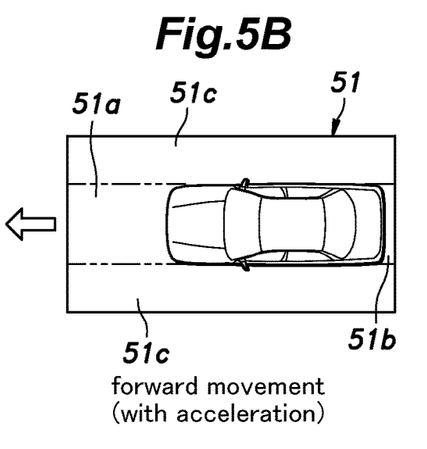

FIG. 5B shows the recognition range 51 when the vehicle accelerates during forward movement with the steering angle being zero (the vehicle is not turning). Note that situations in which the vehicle accelerates during the automatic parking process may include, for example, when the movement of the vehicle is started, when, after stopping or decelerating the vehicle, the travel control unit 44 resumes the movement of the vehicle or restores the speed of the vehicle, and when, after the driver stopped or decelerated the vehicle by pressing the brake pedal 24, the driver releases the brake pedal 24 and the travel control unit 44 resumes the movement of the vehicle or restores the speed of the vehicle.

The front recognition range 51a when the vehicle during forward movement accelerates is widened forward to be larger than the front recognition range 51a when the vehicle during forward movement travels at a constant speed. The left and right lateral recognition ranges 51c when the vehicle during forward movement accelerates are widened laterally outward to be larger than the left and right lateral recognition ranges 51c when the vehicle during forward movement travels at a constant speed, and. It is also possible to enlarge only one of the front recognition range 51a and the left and right lateral recognition ranges 51c. The front recognition range 51a and/or the left and right lateral recognition ranges 51c are enlarged gradually or in steps as the acceleration increases.

Figure 5C:
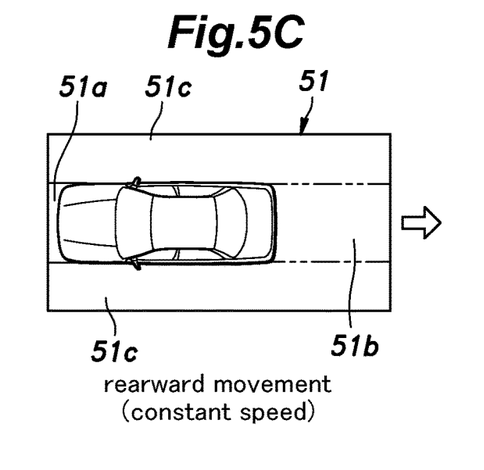

FIG. 5C shows the recognition range 51 when the vehicle moves backward at a constant speed with the steering angle being zero (the vehicle is not turning). The recognition range 51 in this case is in the shape of a rectangle having a length along the fore and aft direction of the vehicle and a width along the lateral direction of the vehicle as seen in plan view, where the front end of the recognition range 51 is positioned slightly forward of the front end of the vehicle, the rear end of the recognition range 51 is positioned rearward of the rear end of the vehicle, and the left and right edges of the recognition range 51 are positioned laterally outward of the left and right edges of the vehicle. The front end of the recognition range 51 may coincide with the front end of the vehicle so that the area of the front recognition range 51a is zero. The rear recognition range 51b when the vehicle moves backward is larger than the front recognition range 51a when the vehicle moves forward at a constant speed, and the left and right lateral recognition ranges 51c when the vehicle moves backward are widened laterally outward to be larger than the left and right lateral recognition ranges 51c when the vehicle moves forward at a constant speed. Note that only the rear recognition range 51b when the vehicle moves backward may be made larger than the front recognition range 51a when the vehicle moves forward or only the lateral recognition ranges 51c when the vehicle moves backward may be made larger than when the vehicle moves forward.

Figure 5D:
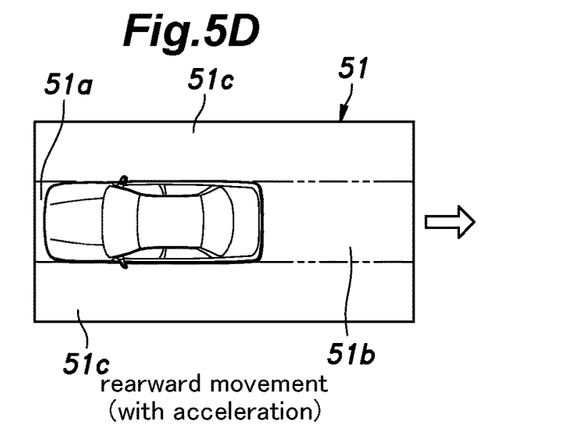

FIG. 5D shows the recognition range 51 when the vehicle accelerates during backward movement with the steering angle being zero (the vehicle is not turning). The rear recognition range 51b when the vehicle during backward movement accelerates is widened rearward to be larger than the rear recognition range 51b when the vehicle during backward movement travels at a constant speed. The left and right lateral recognition ranges 51c when the vehicle during backward movement accelerates are widened laterally outward to be larger than the left and right lateral recognition ranges 51c when the vehicle during backward movement travels at a constant speed. Note that only one of the rear recognition range 51b and the left and right lateral recognition ranges 51c may be enlarged. The rear recognition range 51b and/or the left and right lateral recognition ranges 51c are enlarged gradually or in steps as the acceleration increases.

Figure 5E:
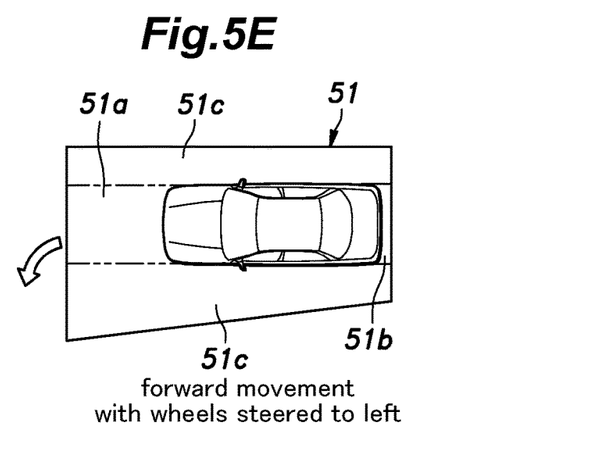

FIG. 5E shows the recognition range 51 when the vehicle moves forward with the front wheels steered to the left. In the illustrated embodiment, the vehicle is configured to change its travel direction in response to the change of the steering angle of the front wheels. In the recognition range 51 when the vehicle moves forward with a non-zero steering angle (namely, the vehicle turns), the lateral recognition range 51c on the inner wheel side of turning (the left side of the vehicle in FIG. 5E) is enlarged laterally outward than the lateral recognition range 51c on the corresponding side when the vehicle moves straight forward, and the front end portion thereof is widened in the lateral direction more than the rear end portion thereof so that the lateral recognition range 51c on the inner wheel side assumes a trapezoidal shape.

Figure 5F:
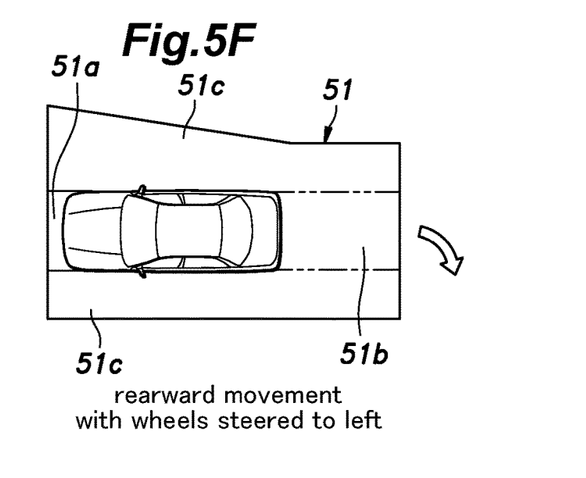

FIG. 5F shows the recognition range 51 when the vehicle moves backward with the front wheels steered to the left. When the vehicle moves backward with a non-zero steering angle (namely, the vehicle turns), the lateral recognition range 51c on the outer wheel side of turning (the right side of the vehicle in FIG. 5F) is enlarged laterally outward in a part thereof positioned forward of the vicinity of the rear end of the vehicle so that the enlarged part of the lateral recognition range 51c on the outer wheel side has a larger width than the lateral recognition range 51c on the corresponding side when the vehicle moves straight backward, and the front end portion of the enlarged part is widened laterally outward more than the rear end portion of the same so that the side edge of the enlarged part is inclined. Note that in the case where the vehicle moves backward with the front wheels steered to the left, the lateral recognition range 51c on the outer wheel side of turning may be enlarged laterally outward over its entirety than the lateral recognition range 51c on the corresponding side when the vehicle moves straight backward, and the front end portion thereof may be widened laterally outward more than the rear end portion thereof such that the lateral recognition range 51c on the outer wheel side assumes a trapezoidal shape. In this way, the recognition ranges 51 when the vehicle turns are adapted to the movement of the vehicle.

FIGS. 5E and 5F show the recognition range 51 when the vehicle turns in the case where the front wheels are the steered wheels. In another case where the rear wheels are the steered wheels, when the vehicle turns during forward movement, the lateral recognition range 51c on the outer wheel side of turning is widened, and when the vehicle turns during backward movement, the lateral recognition range 51c on the inner wheel side of turning is widened. It is preferred that in the widened lateral recognition range 51c, the rear end portion thereof is widened laterally outward more than the front end portion thereof. In this way, the control device 15 widens the recognition range 51 either leftward or rightward such that the recognition range 51 is widened in the direction in which the trajectory of the vehicle may deviate as a result of steering.

In the foregoing parking assist system 1, because the external environment sensor 7 (sonars 18 and external cameras 19) is unmovably fixed to the vehicle, the parking assist system 1 does not need to include components, such as electric motors, to make the eternal environment sensor 7 movable, and thus, the number of components of the parking assist system 1 is reduced compared to the case where the external environment sensor 7 is movable, whereby an increase in the cost can be suppressed. In addition, since the blind spots of the external environment sensor 7 unmovably fixed to the vehicle do not change, obstacles can be detected stably. Thereby, the parking assist system 1 can execute the process to respond to the detected obstacle in a timely fashion.

Further, because the recognition range 51 is changed in accordance with the travel state of the vehicle, compared to the case where the recognition range 51 is fixedly set to cover a wide area, the control device 15 is less likely to make a notification to the driver and/or to perform deceleration or stopping of the vehicle when such actions are actually not needed. Therefore, an increase in time regarding the automatic parking process can be suppressed and the driver's convenience is improved.

When the vehicle moves backward, the driver typically twists the body to look backward, and thus, it is difficult for the driver to check the surroundings of the vehicle. The driver may look into the rear-view mirror or door mirror to see behind the vehicle, but in that case, it is difficult for the driver to grasp the distance between the vehicle and an obstacle behind the vehicle. To solve such a problem, the rear recognition range 51b and the lateral recognition ranges 51c when the vehicle moves backward are respectively made larger than the front recognition range 51a and the lateral recognition ranges 51c when the vehicle moves forward, so that the response of the parking assist system 1 to the obstacle when the vehicle moves backward starts at a point where the relative distance between the vehicle and the obstacle is larger than when the vehicle moves forward, whereby safety is ensured and the driver's anxiety is reduced. In other words, the front recognition range 51a at the time of forward movement in which it is easy for the driver to check the obstacles is made smaller than the rear recognition range 51b at the time of backward movement, and therefore, compared to the case where the recognition range 51 is fixedly set to be wide, the parking assist system 1 is less likely to react to the obstacles unnecessarily and thus the driver's convenience is improved, without impairing the safety.

In the foregoing parking assist system 1, when the vehicle turns, the recognition range 51 is widened laterally, and this contributes to ensuring safety. More specifically, when the vehicle moves forward while turning, the vehicle is displaced toward the inner wheel side of turning, and thus, the lateral recognition range 51c on the inner wheel side of turning is widened laterally outward to ensure safety. When the vehicle moves backward while turning, the front portion of the vehicle is displaced toward the outer wheel side of turning, and thus, the lateral recognition range 51c on the outer wheel side of turning is widened laterally outward to ensure safety. When the vehicle moves straight or does not turn, the vehicle is not displaced in the lateral direction. In the above-described parking assist system 1, the lateral recognition ranges 51c when the vehicle moves straight are smaller than the lateral recognition ranges 51c when the vehicle turns, and therefore, compared to the case where a wide range is fixedly set as the recognition range 51, the parking assist system 1 is less likely to react to the obstacles unnecessarily, whereby the driver's convenience is improved.

Because the higher the acceleration, the more the recognition range 51 is widened, safety is ensured and sudden braking during acceleration can be avoided, whereby good ride quality is achieved.

Concrete embodiments of the present invention have been described in the foregoing, but the present invention is not limited to the above embodiments and may be modified or altered in various ways. For example, the recognition range when the vehicle moves straight or does not turn may have a shape other than a rectangular shape, such as, for example, a trapezoidal shape in which the front end thereof at the time of forward movement and the rear end thereof at the time of backward movement have a width larger than the width of opposite end thereof. In a case where the vehicle moves backward to make a turn, in addition to widening laterally outward the front portion of the lateral recognition range on the outer wheel side, the lateral recognition range on the inner wheel side also may be widened laterally outward in a part thereof positioned rearward of the vicinity of the rear end of the vehicle. The present invention may be applied to a system for controlling an automatic moving process of the vehicle other than the automatic parking process.

The invention claimed is:
1. A vehicle movement assist system, comprising:
an external environment sensor unmovably fixed to a vehicle to detect an obstacle around the vehicle; and
a control device configured to acquire a position of the obstacle relative to the vehicle based on a result of detection performed by the external environment sensor and to execute an automatic moving process to autonomously move the vehicle,
wherein the control device is configured such that, during execution of the automatic moving process, the control device set a range for performing notification to a driver of the vehicle and/or executing a process including deceleration or stopping of the vehicle, if the object is detected in the range, the range including a front range set on a front side of the vehicle, a rear range set on a rear side of the vehicle, and a pair of lateral ranges set on either lateral side of the vehicle, the front range, and the rear range, and
wherein the control device is configured to change the range in accordance with a travel state of the vehicle,
wherein the vehicle is configured to change a travel direction in response to a change of a steering angle of a front wheel thereof, the lateral range on an inner wheel side of turning when the vehicle moves forward to make a turn is larger than the lateral range on a corresponding side when the vehicle moves straight forward, and the lateral range on an outer wheel side of turning when the vehicle moves backward to make a turn is larger than the lateral range on a corresponding side when the vehicle moves straight backward, and the front end portion thereof is widened laterally outward more than the rear end portion thereof.

2. The vehicle movement assist system according to claim 1, wherein the rear range when the vehicle moves backward is larger than the front range when the vehicle moves forward.

3. The vehicle movement assist system according to claim 1, wherein the lateral ranges when the vehicle moves backward are larger than the lateral ranges when the vehicle moves forward.

4. A vehicle movement assist system, comprising:
an external environment sensor unmovably fixed to a vehicle to detect an obstacle around the vehicle; and
a control device configured to acquire a position of the obstacle relative to the vehicle based on a result of detection performed by the external environment sensor and to execute an automatic moving process to autonomously move the vehicle,
wherein the control device is configured such that, during execution of the automatic moving process, the control device set a range for performing notification to a driver of the vehicle and/or executing a process including deceleration or stopping of the vehicle, if the object is detected in the range, the range including a front range set on a front side of the vehicle, a rear range set on a rear side of the vehicle, and a pair of lateral ranges set on either lateral side of the vehicle, the front range, and the rear range, and wherein the control device is configured to change the range in accordance with a travel state of the vehicle,
wherein the vehicle is configured to change a travel direction in response to a change of a steering angle of a rear wheel thereof,
the lateral range on an outer wheel side of turning when the vehicle moves forward to make a turn is larger than the lateral range on a corresponding side when the vehicle moves straight forward and the rear end portion thereof is widened laterally outward more than the front end portion thereof, and
the lateral range on an inner wheel side of turning when the vehicle moves backward to make a turn is larger than the lateral range on a corresponding side when the vehicle moves straight backward.

5. The vehicle movement assist system according to claim 1, wherein the front range when the vehicle moves forward with acceleration is larger than the front range when the vehicle moves forward at a constant speed and the rear range when the vehicle moves backward with acceleration is larger than the rear range when the vehicle moves backward at a constant speed, and/or
wherein the lateral ranges when the vehicle moves forward with acceleration are larger than the lateral ranges when the vehicle moves forward at a constant speed and the lateral ranges when the vehicle moves backward with acceleration are larger than the lateral ranges when the vehicle moves backward at a constant speed.

6. The vehicle movement assist system according to claim 1, wherein the vehicle movement assist system comprises a parking assist system configured to perform, as the automatic moving process, an automatic parking process of autonomously moving the vehicle from a current position to a target position and stopping the vehicle at the target position.

* * * * *